United States Patent
Bolms et al.

(10) Patent No.: US 8,414,264 B2
(45) Date of Patent: Apr. 9, 2013

(54) METHOD FOR PRODUCING A GAS TURBINE COMPONENT WHICH IS TO BE COATED, WITH EXPOSED HOLES, DEVICE FOR CARRYING OUT THE METHOD, AND COATABLE TURBINE BLADE WITH FILM COOLING HOLES

(75) Inventors: Hans-Thomas Bolms, Mülheim an der Ruhr (DE); Stefan Irmisch, Niederrohrdorf (CH); Jan Münzer, Berlin (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 11/992,526

(22) PCT Filed: Sep. 14, 2006

(86) PCT No.: PCT/EP2006/066365
§ 371 (c)(1),
(2), (4) Date: Mar. 9, 2009

(87) PCT Pub. No.: WO2007/036437
PCT Pub. Date: Apr. 5, 2007

(65) Prior Publication Data
US 2009/0220349 A1    Sep. 3, 2009

(30) Foreign Application Priority Data
Sep. 26, 2005  (EP) .................................... 05020966

(51) Int. Cl.
*B23K 26/04* (2006.01)
(52) U.S. Cl.
USPC ......... 416/97 R; 382/152; 382/171; 700/166; 219/121.71

(58) Field of Classification Search ................ 416/97 R; 382/152, 171; 700/166; 219/121.71
See application file for complete search history.

(56) References Cited

U.S. PATENT DOCUMENTS

| | | | | |
|---|---|---|---|---|
| 5,418,345 | A * | 5/1995 | Adamski | 219/69.17 |
| 5,741,096 | A * | 4/1998 | Olds | 408/1 R |
| 6,380,512 | B1 * | 4/2002 | Emer | 219/121.71 |
| 6,723,951 | B1 | 4/2004 | McGraw | |
| 2003/0123707 | A1 * | 7/2003 | Park | 382/106 |
| 2003/0217997 | A1 * | 11/2003 | Clauer et al. | 219/121.85 |
| 2005/0067394 | A1 * | 3/2005 | Vaidyanathan et al. | 219/121.83 |

FOREIGN PATENT DOCUMENTS

| | | | |
|---|---|---|---|
| EP | 1510283 | * | 3/2005 |
| EP | 1510283 | A1 | 3/2005 |
| EP | 1520652 | A1 | 4/2005 |

(Continued)

*Primary Examiner* — Jenny L Wagner
*Assistant Examiner* — Mark Tornow

(57) ABSTRACT

There is described a method with which, on the basis of a three-dimensional recording of a component to be reworked, its surface configuration can be determined and stored temporarily so that, after it has been coated, it can be produced in its original surface form, or in its surface form then required, in certain regions, i.e. locally in the area of film-cooling openings. An especially precise and quick three-dimensional recording can be achieved by the use of the triangulation method. In this case, a reference pattern depicted on the component by a projector is recorded by two camera arranged at an angle. From the images from the cameras, the coordinates describing the surface three-dimensionally can then be determined by a control system using the triangulation method.

12 Claims, 2 Drawing Sheets

FOREIGN PATENT DOCUMENTS

| | | |
|---|---|---|
| JP | 02088152 A | 3/1990 |
| JP | 2005103644 A | 4/2005 |
| JP | 2005524533 T | 8/2005 |
| WO | 03003117 A1 | 1/2003 |

* cited by examiner

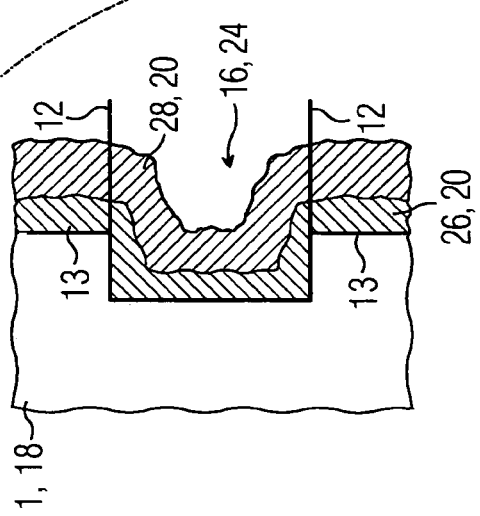
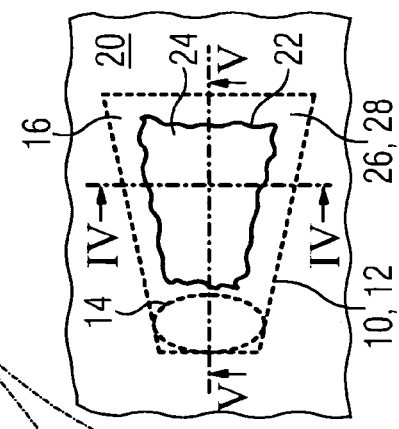
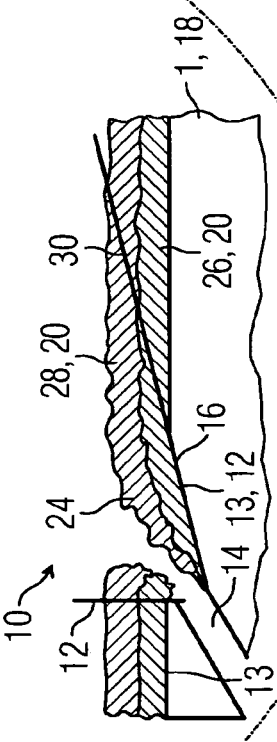
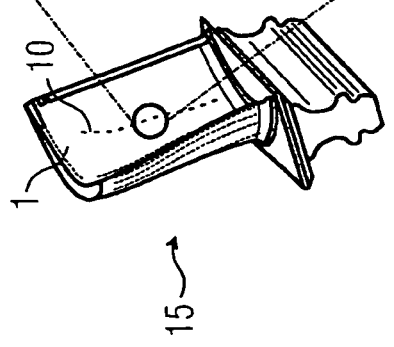

METHOD FOR PRODUCING A GAS TURBINE COMPONENT WHICH IS TO BE COATED, WITH EXPOSED HOLES, DEVICE FOR CARRYING OUT THE METHOD, AND COATABLE TURBINE BLADE WITH FILM COOLING HOLES

CROSS REFERENCE TO RELATED APPLICATIONS

This application is the US National Stage of International Application No. PCT/EP2006/066365, filed Sep. 14, 2006 and claims the benefit thereof. The International Application claims the benefits of European Patent Office application No. 05020966.7 EP filed Sep. 26, 2005, both of the applications are incorporated by reference herein in their entirety.

FIELD OF INVENTION

The invention relates to a method for producing a gas turbine component which is to be coated, with exposed holes, wherein the surface configuration of the component is predetermined and stored for scanning the position and shape of the holes before its coating, and, after its coating, for exposing the holes which are covered by the coating material, the control system, based on the predetermined surface configuration of the component, positions a tool in relation to the component in such a way that the tool exposes the corresponding hole by local removal of the coating material, or reproduces its shape. Furthermore, the invention relates to a device for carrying out the method, and to a coatable turbine blade with film cooling holes.

BACKGROUND OF INVENTION

Hollow turbine stator blades and rotor blades which are produced from superalloys, with film cooling holes out of which cooling air can flow during operation, are known. The cooling air creates a cooling film on the surface of the turbine blade, especially on its airfoil profile, which protects the turbine blade material against heat yield from the hot gas which flows around the turbine blade. These film cooling, holes penetrate the component wall and are arranged in the blade surface in such a way that the hole pattern, i.e. the arrangement of the holes in relation to each other and the hole geometry of each hole, and the cooling air mass flow which is blown through the holes, creates a continuous, protective cooling film.

On account of the particularly high thermal stresses, the regions of the turbine blades of the front turbine stages, which are exposed to hot gas, are additionally provided with anti-oxidation coatings and/or thermal barrier coatings. So-called MCrAlY coatings based on the corresponding superalloy, which are applied by plasma spraying processes, are used as anti-oxidation coatings. In addition, a thermal barrier coating of partially stabilized zirconium oxide is used. This oxide ceramic is applied after the MCrAlY coating by means of the electron beam physical vapor deposition process, or by means of atmospheric plasma spraying (APS), to the regions of the turbine blade which are to be protected.

The film cooling holes as a rule are introduced after the MCrAlY coating by means of laser drilling or spark erosion, especially if a thermal barrier coating is subsequently deposited by thermal evaporation by means of the EB-PVD process. If, instead, the APS process is used for the application of the thermal barrier coating, the introducing of the cylindrical holes is carried out by means of laser irradiation usually afterwards, that is through the ceramic thermal barrier coating. Since non-cylindrical, but profiled, diffuser-shaped film cooling holes are produced as profiled holes almost exclusively by means of spark erosion, these, however, must be introduced in advance because the ceramic thermal barrier coating is not electrically conductive and consequently production of the profiled holes is not correspondingly possible. If the profiled holes, however, are produced before the coating of the thermal barrier coating in the APS process, then these for the most part have to be very expensively protected by means of masking, because their geometry and contour would be unacceptably altered as a result of the coating (coat down effect).

Since the deposit of coating material in the profiled holes leads to an unacceptable impairment of the subsequent film cooling actions (on account of the consequently altered hole geometry, as a result of which the cooling air jet discharge width, the spatial direction of the cooling air impulse and the cooling air mass flow are altered), the coating material, subsequent to the coating (or subsequent to the recoating of a component which is to refurbished), has to be carefully removed from the covered profiled holes in a reworking process in order to reproduce the predetermined and desired geometry of the profiled holes for the need-based cooling and protective action of the cooling air which is blown out.

To this end, U.S. Pat. No. 6,380,512 B1 discloses a method for removing coating material from the discharge holes of cylindrical film cooling holes by means of laser irradiation. The largely program-controlled method determines the precise position of the hole which is to be made on the surface of the component, based on the electronically provided three-dimensional construction data, with reference to a defined holding system of the turbine blade. With a three-axis holding device for the turbine blade, which is associated with the device, this is moved by a CNC machine relative to a drilling laser and to a video optical system and positioned in space. On account of the geometry variations as result of operating stress and/or manufacturing and repair processes in the life cycle of the actual component, however, the actual geometry deviates from the theoretical or original three-dimensional definition. A video-camera with lenses orientated concentrically to the laser optics captures an image of the possibly closed discharge opening of the hole. The two-dimensional image which is projected in the longitudinal direction of the hole is then evaluated by means of image processing software, so that the position of the respective hole center point in the projection plane can be approximately determined from it. After the scanning of all the holes, these are compared with the 3D construction data in order to determine from it the most accurate actual position of the hole, i.e. with high probability. After that, the hole is exposed by means of laser drilling. The positioning of the turbine blade, the scanning of the possibly concealed hole position, the calculating of the probably actual position based on the 3D construction data, and the removing of the coating material, is then repeated for each hole.

Consequently, only a two-dimensional image of the component geometry ensues in a projection plane of the camera lens. These images have to be expensively linked to the three-dimensional construction data of the component, taking into account the associated component-dependent reference holding system, in order to be able to determine the actual position of the holes in the turbine blade. Therefore, the component must be held in a defined manner in a reference system in order to thus be able to make the connection between the three-dimensional component geometry and the position of the drilling laser in space via a common coordinate system.

A program-controlled processing of non-cylindrical hole structures or profiled holes (so-called fan-shaped holes) cannot be carried out by the described method from the closest prior art on account of the two-dimensional processing. Furthermore, the processing of the cylindrical holes, which to a great extent are partially closed off, or completely closed off, with coating material, with soldering material or with welding additive, depends upon the position identification software, wherein the known method, based on the stored data set, is limited with regard to the achievable positionability.

In particular, thermal barrier coatings which are applied in the APS process close off the cylindrical holes almost completely so that exposure of the holes which are at least partially closed off by it is not possible, or not possible with sufficient accuracy. Furthermore, three-dimensional structures in non-conducting ceramic coating, for example diffuser-shaped profiled holes, up to now cannot be processed by means of laser beam, and therefore in general cannot be mechanically processed subsequent to a cost-effective APS (re-)coating.

It is also known from U.S. Pat. No. 6,380,512 B1 that the determining of the actual position of each hole can be carried out exclusively by means of an optical scanning process, which is carried out before coating the turbine blade. However, this is very complex.

SUMMARY OF INVENTION

An object of the invention, therefore, is the provision of a simple method for scanning and producing a gas turbine component which is to be coated, with exposed holes, with which removing of coating material from non-cylindrical and cylindrical film cooling holes in gas turbine components, which are covered with this, is possible. Furthermore, for this purpose it is the object of the invention to disclose a corresponding device and a turbine blade which in its three-dimensional structure can be especially simply scanned.

The object which is focused upon the method is achieved by the features of an independent claim. The invention proposes that in the generic method the actual surface configuration of the component is optically three-dimensionally scanned for detecting the position of the holes before its coating.

The invention is based on the knowledge that the construction data set with the positions of the film cooling holes, which are described in three-dimensional space, from the closest prior art is not necessary if, before coating, the tolerance-dependent actual surface configuration of the component and of the hole which is located therein, are three-dimensionally scanned by a video system before coating. By means of the three-dimensional scanning, the component geometries and also the component surface configuration are also scanned in a spatial depth so that by means of a suitable tool, which is movable in space, the originally existing shape of the component surface configuration can be mechanically partially reproduced, after coating, by the coating material which is subsequently applied to the surface configuration being removed in a contour-accurate manner after scanning.

With the method according to the invention, it is possible for the first time to also correctly reproduce, by means of a suitable tool, three-dimensional structures, such as profiled holes and diffuser-shaped cooling air holes (fan-shaped holes), in their original position and contour after coating the blade material which surrounds the holes, since, before coating, the original state of each profiled hole itself and its position on the component, or, for example, its positioning in relation to the cylindrical supply hole, was predetermined.

The processing can be exceptionally accurately carried out on account of the high precision of the measuring system. By means of the described method the processing of profiled holes which are almost or completely closed off by one or more coatings, especially despite using the inexpensive APS process, is possible. This applies in a particular way to diffuser-shaped profiled holes, but equally to cylindrical holes. It is also novel that the two protective coatings, that is the metallic MCrAly anti-oxidation coating and the ceramic thermal barrier coating, despite their different mechanical and electrical properties, can be removed from the contoured film cooling holes, i.e. the profiled holes, in one operation by means of a single tool, for example by means of a drilling laser, which gives rise to further cost and time advantages.

Advantageous developments are disclosed in the dependent claims.

In an advantageous development, the three-dimensional scanning is carried out by means of a triangulation method. This method has a higher measuring accuracy than the known measuring method. Furthermore, this method enables an accurate definition of the surface configuration or of its relief in three-dimensional space, that is also in spatial depth, and not only in the two-dimensional plane. Therefore, this method is especially suitable for three-dimensional scanning of profiled holes which are introduced in a turbine blade.

For determining the surface configuration of the component, a projector projects in an advantageous manner a reference pattern, preferably a movable stripe image, onto the component. On account of the profiled, uneven surface of the component, the reference pattern is displayed upon this in a distorted manner compared with its original and known pattern. The illuminated turbine blade with the distortions is captured as an image by the video system and electronically transmitted to the control system. The control system uses the reference pattern, which is displayed on the component in a distorted manner, in order to determine from it by way of calculation, and to store, the three-dimensional coordinates of the actual surface configuration of the component, and consequently also of the non-cylindrically formed profiled holes. This predetermination of the position of the profiled holes of each individual component, which is possibly to be processed, is to be carried out by means of the video system and the control system before its coating or before its recoating. As a result, it is possible to accurately scan in a true-to-detail manner the component in the unfinished state, or before a further coating, with film cooling holes which have already been introduced, and to electronically store the three-dimensional coordinates of the surface configuration as data in the control system. After coating has been carried out, this data is used by the device in order to expose the possibly partially or completely covered profiled holes by local removal of coating material. On account of the triangulation method which is used, with the described 3D stripe light scanning technique, a costly lighting of the component or even a surface pretreatment, as in the case of the known prior art, can be dispensed with.

In an especially advantageous development of the invention, the current position of the component or of the profiled holes is calculated by using a reference geometry element which is provided on the component, or is calculated in relation to a global coordinate system. A cost-intensive movable mounting, as in the case of the known prior art, can accordingly be dispensed with, since the scanning of the surface configuration of the component and also of the holes can be scanned independently of the relative position of the component to the video system. As a result of this, it is possible that the component can also be measured and also processed in the still installed state in a machine, in-situ, with a suitable device.

In this case, the spatial reference geometry element, which is freely selectable in its form, is preferably arranged on a section of the component which is not coated. Therefore, it is possible to scan a reference geometry element for predetermining the surface configuration of the component, which, after coating, can be conclusively (re-)identified in an unaltered state in a second measuring process by the video system and the control system, and which is to be used as a coordinate origin. During the scanning of the uncoated component, the coordinates or data which are used and stored for determining the surface configuration of the component are therefore related to the reference geometry element, and, for removing the coating material, this data is similarly related to the reference geometry element which is re-identified by the video and control system. A reference holding device which is in communication with the control system, as in the case of the prior art, is not absolutely necessary.

Since the component surface is calculated in relation to a global coordinate system, or in relation to a reference geometry element of the component which is measured in the unfinished state or in the uncoated state, the tool can be moved along the contour of the holes and in a contour-accurate manner can remove the coating material in this region which negatively influences the cooling air flow.

The coating material is preferably removed by means of a drilling laser, a mechanical or a chemical material removal method, or by means of spark erosion. These inexpensive processes are known from the prior art and have the necessary accuracy to produce the desired contour of the profiled holes.

The second-mentioned object is achieved by means of the provision of a device according to the features of a further independent claim.

The invention proposes that the video system has at least one projector and at least two cameras, which are arranged for the three-dimensional scanning of the surface configuration of the component which is to be processed.

In this case, the component is illuminated by a projector with a reference pattern which preferably comprises movable light stripes. On account of the profiled surface configuration of the component, the parallel light stripes which are projected as a reference pattern by the projector are displayed on the component in a distorted manner. The distortions are captured in the form of images by two cameras which lie in one plane and are transmitted to the control system which detects and electronically stores in three-dimensional coordinates the actual surface configuration from them. Since, moreover, each camera has an optical axis which meet at an angle, by using the triangulation method the coordinates of each point which lies on the surface of the component can be determined or calculated by the control system, preferably in relation to the reference geometry element. As a result of this, it is possible to restore a component, which is scanned and recorded before processing, into the original state in areas after processing, for example after its coating, or to reproduce its original surface configuration by means of a suitable tool.

Consequently, the aforementioned problem can be solved with exceptionally low equipment cost and with little measuring and processing time without costly measures, such as a special lighting or an expensive surface pretreatment, being necessary. Also, the provision and use of the originally 3D construction data, and also the time-intensive comparison between this data and the data which is determined during the optical scanning process, becomes obsolete. Moreover, a cost-intensive reference holding device, as is known from the prior art, is dispensed with. Furthermore, even the in-situ processing of components is possible.

On account of the reference geometry element according to the invention which is arranged on the component, it is possible to provide an especially cost-effective mounting for the device according to the invention, in which the component is only rigidly mounted. On account of the method which can be carried out by the device, it is possible that all the holes which are in visual communication with the two cameras can be scanned by these. For exposing the holes, the component no longer has to be moved relative to the video system. All the profiled holes which are scanned from one perspective can be exposed by the device according to the invention by means of the tool. The capturing of the geometry data or of the surface configuration of the component which is subsequently to be processed is preferably extensively carried out from two or more perspectives, in order to cover all the surfaces of the component in which profiled holes are provided. The coordinates, that is the geometry data, of two perspectives which are calculated by the control system are linked by this and related to the reference geometry element so that from this the outer contour of the viewed or of the scanned component is determined by the control system and stored within this as a coordinate origin. After the coating of the component, this can be scanned again by means of the device from a similar perspective. In doing so, new coordinates which describe the coated surface are determined by the control system in order to then expose in a true-to-contour manner the profiled holes which are possibly partially concealed or covered by the coating material. During the initial scanning of the coated individual component, attention is simply to be paid to the fact that the uncoated reference geometry element which is provided on the component is also scanned in order to relate to it the coordinates which describe the surface.

The component which is to be processed does not have to be moved in relation to the video system for each film cooling hole which is to be opened or exposed. Only the tool is moved in relation to the component. Moreover, all the profiled holes which are captured by the two cameras during a scanning process can be exposed in succession. This leads to an especially quick processing and, as a result, to a shortened processing duration of the component.

An object which is focused upon the turbine blade is achieved by the features of a further independent claim.

BRIEF DESCRIPTION OF THE DRAWINGS

An exemplary embodiment of the invention is explained in the following with reference to the drawing.

In the drawing:

FIG. 2 shows a perspective view of a coated turbine blade with film cooling holes which are arranged in the airfoil profile, FIG. 3 shows a detailed view of a film cooling hole, which is partially covered with coating material, for blowing out cooling air of the turbine blade from FIG. 2, FIG. 4 shows a first sectional view of the partially coated film cooling hole according to FIG. 3 and FIG. 5 shows a second sectional view of the partially coated film cooling hole according to FIG. 3.

DETAILED DESCRIPTION OF INVENTION

Figure 1:
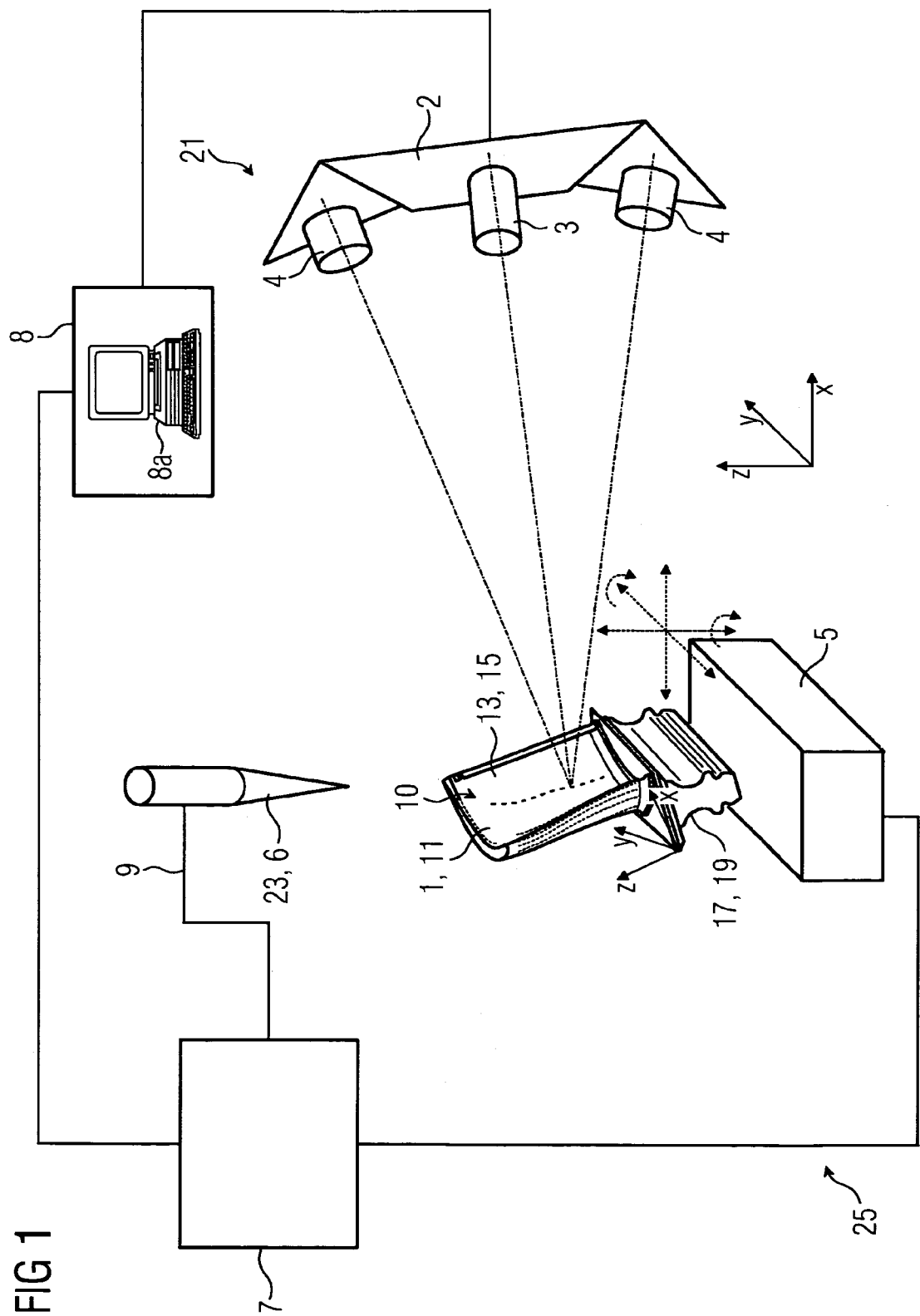
FIG. 1 shows a perspective view of a device for carrying out a method for producing a coated component which is provided with holes.

The invention is described in the example of removing coating material from holes in turbine blades which are covered by this. Instead of removing coating material, the component can also be otherwise modified and processed by the method and the device. For example, the component can be ground, or holes can also be subsequently added, or already existing holes can be closed off again. Combinations of different processes are also conceivable. The use of the method and of the device is accordingly not limited to the exemplary embodiment which follows.

The component 1 which is to be processed within the scope of its production process is a turbine blade 11 of a gas turbine. For removing material which is present on its surface 13, the turbine blade 11 is supported in a mounting 5 which is formed specially for it, or is even fastened in the machine, for example in a gas turbine.

The turbine blade 11 has profiled holes, which serve as film cooling holes 10, which are arranged in an airfoil profile 15. With the turbine blade 11 installed in a gas turbine, a cooling air jet can issue through each film cooling hole 10. On account of the close row arrangement of the film cooling holes 10, the cooling air jets, which issue individually, are combined into a flat cooling air film which is to effectively protect the component 1 against a hot gas which flows around the airfoil profile 15. In order to achieve an unbroken and especially reliable cooling air film, each profiled hole in the component surface does not open out in a circular or oval shape but in a contoured, diffuser-shaped discharge section (FIG. 3).

Moreover, a spatial reference geometry element 17, which is freely selectable in its configuration, is provided on the component 1, for example a three-dimensional graticule is provided. In the case of the turbine blade 11, the reference geometry element 17 is arranged in a region which is not intended for coating, for example on the blade root 19. If the device has a separate, dedicated mounting 5 or holding device, the reference geometry element 17 on the component 1 can be dispensed with.

For removing the material from the component 1, the device 25 has a video system 21 which is formed as a stripe light scanner 2, comprising a projector 3 for projecting movable light stripes onto the component 1, and two digital or video cameras 4 which are mounted at an angle to each other. The video system 21 is in communication with a control system 8 which links together, as measured data, images of the component 1 which are captured by the video camera 4. From this, with commercially available software, the control system 8, which for example is formed as a computer 8a, using the triangulation method, can convert the surface configuration of the scanned component 1 into coordinates which three-dimensionally describe the surface configuration, that is inclusive of the profiled holes which are provided therein. These coordinates, which for example are filed in Cartesian form x, y, z, are related to the reference geometry element 17 which is also scanned and used as a coordinate origin, and are then electronically stored, for example on a hard disk of the computer 8a.

Furthermore, the device 25 comprises a tool 23 for removing the coating material 20, for example a drilling laser 6 or an erosion tool which is formed corresponding to the contour 12 (FIG. 3) of the profiled holes or the film cooling holes 10. Moreover, the device 25 has a movement system 9 with a CNC control 7 for the tool 23.

The tool 23 is attached on the free end of the robot arm-like movement system 9, which for example is equipped with a plurality of degrees of freedom, and can reach each point of the surface 13 of the scanned component 1 in order to modify and/or to rework this. A movement system 9 in the style of a CNC machine, in which the component 1 is additionally moved by means of the mounting 5 which is formed as a positioning mechanism, is also conceivable.

Before coating the untreated component 1, this is scanned by the device 25 according to the invention in a first process step, and the coordinates which three-dimensionally describe the surface configuration are stored as component geometry data in order to partially reproduce, or reproduce in areas, its original contour after processing. The prescanning can be carried out by means of one or more image recordings of the video system 21 from overlapping images. For example, the coated surface of the component 1 can be fully recorded from three perspectives: a first image recording shows the front side, a second image recording shows the side view, and a third image recording shows the rear side of the component 1. Each image recording therefore extensively covers the component 1.

After processing of the component 1 has been carried out, for example by means of welding or soldering, but above all after coating or even after recoating with a metallic anti-oxidation coating 26 and/or a ceramic thermal barrier coating 28, the coating material 20 can be very accurately removed from the film cooling holes 10 or profiled holes by means of the tool 6. For this purpose, after coating, in a second process step the front side of the processed component 1, for example the coated turbine blade 11, is first of all rerecorded by the video system 21 and scanned by the control system 8. The re-scanned component geometry data is compared with the originally scanned component geometrie data by the control system 8. As a result, even profiled holes that were not detected in the second process step because they were completely covered by coating material 20 are nonetheless accurately localized on account of their position having been previously determined in the first process step and therefore being known.

All the profiled holes which are detected or localized during the extensive image recording are then exposed by the control system 8 or computer 8a, by this controlling the CNC machine and the tool 6, using the component geometry data which is determined in the first process step. Each profiled hole is accordingly reproduced in its original contour 12 by the coating material 20 which is deposited therein being removed by the tool 6. In this way, all the profiled holes which are localized-during the image recording are reworked in succession without a separate image recording being necessary for each profiled hole, as in the case of the prior art.

After this, the rear side of the component 1 can be covered by means of a second image recording, and the profiled holes which are provided on this side are processed accordingly.

If the component 1 which is to be processed is provided in a mounting 5 which is formed specially for it and which can also be movable with a plurality of degrees of freedom when required, the component 1 can be pivoted into the original position, i.e. into the position during the first scanning, and can therefore be brought into alignment. This reduces the calculating time for the control system 8.

Alternatively, holes, which for example have been closed off by soldering, can also be reopened in a true-to-original manner at the original place. For this purpose, for processing, the component geometry data which is determined in the first process step is evaluated with regard to the original hole position and hole geometry and transmitted by the control system 8 to the CNC control 7, which controls both the positioning of the component 1 and positioning of the drilling laser or tool 6.

FIG. 2 shows the film cooling holes 10 which are arranged in rows on the surface 13 of the film-cooled turbine blade 11 and which can be partially closed off with coating material 20 as a result of a subsequent coating process.

For this purpose, detail X exemplarily shows in FIG. 3 the film cooling hole 10, the original contour 12 of which is represented in the style of a dashed line. The film cooling hole 10 consists of a cylindrical hole 14 which penetrates the turbine blade wall at an angle, and a downstream diffuser section 16, as seen in the direction of cooling air which flows out through it, and which in the present example in the development which is shown in FIG. 3 adjoins in a trapezoidal manner the hole 14 which in the form of an oval leads to the surface 13. The mouth of the hole 14, which leads to the surface 13 at an angle, and also the diffuser section 16, represent the discharge section 24 for the outflowing cooling air jet. The film cooling hole 10 which is represented in the style of a dashed line, or its original contour 12, on account of the flat coating of the airfoil profile 15 of the component 1 is at least partially concealed with coating material 20 which is shown by means of its contour outline 22. The surface which is enclosed by the contour outline 22 therefore represents a deeper lying coated region of the original profiled hole.

In order to expose the diffuser section 16 of the film cooling hole 10 and to remove coating material 20 which is deposited at this point, the tool 6, for example a drilling laser or another suitable device or method, is used and controlled by the control system 8. The tool 6 is moved along the original contour 12 and across the surface which is enclosed by this in order to remove the coating material 20 there and to expose the profiled hole over the whole area. Instead of a drilling laser, another mechanical or chemical material removal process, and also for example spark erosion, can also be used.

FIG. 4 and FIG. 5 show the sectional views of FIG. 3 according to the sections which are inscribed therein. In the sectional views, it clear to see that the discharge section 24, i.e. the diffuser section 16 and the mouth of the hole, is altered in its geometric shape, both as a result of the anti-oxidation coating 26 and the thermal barrier coating 28, which, during operation, impairs, and possibly even prevents, the formation of the desired cooling air film.

By means of the method which can be carried out by the device 25 according to the invention, the coating material 20 in the discharge section 24 and in the film cooling hole 10, which impairs the cooling air flow, can be removed exceptionally accurately and in a true-to-contour manner, so that the profiled original contours 12 can be comparatively quickly and inexpensively reproduced despite the coating.

Furthermore, it is possible with the method according to the invention that the discharge section 24 is enlarged beyond the downstream end of the diffuser section 16. This leads to the formation of an especially efficient cooling air film, since the coatings 26, 28 at this point are only partially removed and, as seen in the flow direction, have a material thickness which becomes greater. The inclination of the diffuser section 16 (see FIG. 5) is therefore continued in alignment beyond this, so that, as seen in the flow direction, first of all the anti-oxidation coating 26 continuously increases from a minimum coating thickness to its maximum coating thickness, and again further downstream the thermal barrier coating 28 similarly continuously increases from a minimum coating thickness to its maximum coating thickness, in the way that the line 30 shows it. Aerodynamically detrimental edges, therefore, can be avoided.

In all, with little equipment cost on account of the three-dimensional scanning of the component which is to be reworked, its surface configuration can be determined in a true-to-contour manner and temporarily stored in order to produce its original or desired surface shape in areas, i.e. locally in the region of the film cooling holes, for example after its coating. An especially accurate and quick three-dimensional scanning can be achieved as a result of using the triangulation method. In this case, a reference pattern which is displayed by a projector on the component is captured by two cameras which are arranged at an angle. From the images of the cameras, the coordinates which three-dimensionally describe the surface can then be determined by a computer, using the triangulation method.

This accurate (re-)production of the contours of the round film cooling holes, or even other contoured profiled holes, by means of the method, also lead to a turbine blade which can be especially cost-effectively produced since a masking, which protects the film cooling holes against coating material, can be dispensed with if the turbine blade is coated. Moreover, the especially favorable APS coating process can be used for applying the anti-oxidation coating and the thermal barrier coating, and also possibly further coatings such as primer layers or other coatings, especially when refurbishing already drilled and operationally-stressed components.

The invention claimed is:

1. A method for producing a gas turbine component with exposed holes, wherein the gas turbine component has to be coated, comprising:
   visually predetermining and storing a surface configuration of the component for scanning a position and a shape of the component and the holes before coating, wherein the surface configuration of the component is optically three-dimensionally scanned using a triangulation method, wherein a position of the uncoated component or of the holes is calculated based upon a reference geometry element that is integral to the component;
   visually three-dimensionally rescanning the surface configuration of the component after coating for exposing the holes covered with coating material;
   comparing the three dimensional scan of the component before coating with the three dimensional scan of the component after coating to determine a position and orientation of the coated component; and
   positioning a tool in relation to the position and orientation of the coated component such that the tool exposes the corresponding hole by means of local removal of the coating material.

2. The method as claimed in claim 1, wherein a projector projects on the component a reference pattern, for determining a position of the component.

3. The method as claimed in claim 2, wherein the pattern is a movable stripe image.

4. The method as claimed in claim 1, wherein a current position of the component or of the holes is calculated based upon an uncoated reference geometry element provided on the component.

5. The method as claimed in claim 1, wherein the tool is moved along a contour of the holes.

6. The method as claimed in claim 1, wherein the local removal of coating material is based upon a drilling laser.

7. The method as claimed in claim 1, wherein the local removal of coating material is based upon a mechanical material removal method.

8. The method as claimed in claim 1, wherein the local removal of coating material is based upon a chemical material removal method.

9. The method as claimed in claim 1, wherein the local removal of coating material is based upon a spark erosion.

10. A method for producing a gas turbine component with exposed holes, wherein the gas turbine component has to be coated, comprising:
   visually predetermining and storing a surface configuration of the component in order to ascertain a position and a shape of the holes before coating, wherein the surface configuration of the component comprises three dimensional information about the surface configuration and the three dimensional information is derived from optical scans;

visually three dimensionally rescanning the surface configuration of the component after coating for exposing the holes covered with coating material;

comparing geometry data from the three dimensional scan of the component before coating with geometry data from the three dimensional scan of the component after coating to determine a surface configuration of the coated component; and positioning a tool in relation to the coated component such that the tool exposes the corresponding hole by means of local removal of the coating material.

11. The method of claim 10, wherein a current position of the component or of the holes is calculated based upon a reference geometry element that is integral to the component.

12. The method of claim 10, wherein the three dimensional information is derived using a triangulation method.

* * * * *

UNITED STATES PATENT AND TRADEMARK OFFICE
CERTIFICATE OF CORRECTION

| | | |
|---|---|---|
| PATENT NO. | : 8,414,264 B2 | Page 1 of 1 |
| APPLICATION NO. | : 11/992526 | |
| DATED | : April 9, 2013 | |
| INVENTOR(S) | : Hans-Thomas Bolms et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 604 days.

Signed and Sealed this
Sixth Day of August, 2013

Teresa Stanek Rea
*Acting Director of the United States Patent and Trademark Office*